United States Patent
Li et al.

(10) Patent No.: US 12,418,629 B2
(45) Date of Patent: Sep. 16, 2025

(54) RECOMMENDING CONNECTING ON A PLATFORM BASED ON PARTICIPANT INTERACTION

(71) Applicant: Lenovo (Singapore) Pte. Ltd., New Tech Park (SG)

(72) Inventors: Scott Li, Cary, NC (US); Igor Stolbikov, Apex, NC (US); Rafael Rodrigues Machado, São Paulo (BR); Denis Leite Gomes, Campinas (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 245 days.

(21) Appl. No.: 18/189,490

(22) Filed: Mar. 24, 2023

(65) Prior Publication Data

US 2024/0323319 A1  Sep. 26, 2024

(51) Int. Cl.
*H04N 7/15* (2006.01)
*H04N 7/14* (2006.01)

(52) U.S. Cl.
CPC .............. *H04N 7/152* (2013.01); *H04N 7/147* (2013.01)

(58) Field of Classification Search
CPC .......... H04N 7/152; H04N 7/147; H04N 7/15; G06Q 50/01; H04L 12/1822; H04L 51/52; H04L 65/403
See application file for complete search history.

(56) References Cited

U.S. PATENT DOCUMENTS

| | | | | |
|---|---|---|---|---|
| 10,560,662 | B1* | 2/2020 | Tippana | H04L 65/1069 |
| 2008/0234043 | A1* | 9/2008 | McCaskey | A63F 13/30 |
| | | | | 463/29 |
| 2013/0041947 | A1* | 2/2013 | Sammon | H04M 7/0024 |
| | | | | 709/204 |
| 2020/0382618 | A1* | 12/2020 | Faulkner | H04L 65/403 |
| 2023/0121307 | A1* | 4/2023 | Benchetrit | H04N 7/157 |
| | | | | 705/319 |

* cited by examiner

*Primary Examiner* — Stella L. Woo
(74) *Attorney, Agent, or Firm* — Kunzler Bean & Adamson

(57) ABSTRACT

Apparatus, methods, and computer program products that recommend connecting on a platform based on participant interaction are disclosed. One apparatus includes a processor and a memory. The memory includes instructions executable by the processor to cause the apparatus to track interaction between a pair of participants of a digital environment conducted on a first platform and recommend that the pair of participants connect on a second platform in response to the interaction between the pair of participants exceeding a predetermined threshold of interactions. Methods and computer program products that include and/or perform the operations and/or functions of the apparatus are also disclosed.

20 Claims, 8 Drawing Sheets

RECOMMENDING CONNECTING ON A PLATFORM BASED ON PARTICIPANT INTERACTION

FIELD

The subject matter disclosed herein relates to video streaming and, more particularly, relates to recommending connecting on a platform based on participant interaction.

DESCRIPTION OF THE RELATED ART

Modern conference sessions are evolving to include channels with video, voice, and chat components. Federated users and non-federated users are able to join a conference session/channel. When a non-federated user's invitation period expires or a federated user becomes an ex-federated user, their contact information and content is typically no longer available to other participants of a particular conference session/channel. As such, participants that interacted with one another during a particular conference session/channel may lose contact with each other and/or may not be able to reconnect in the future.

BRIEF SUMMARY

Apparatus that can recommend connecting on a platform based on participant interaction are disclosed. One apparatus includes a processor and a memory. The memory includes instructions executable by the processor to cause the apparatus to track interaction between a pair of participants of a digital environment conducted on a first platform and recommend that the pair of participants connect on a second platform in response to the interaction between the pair of participants exceeding a predetermined threshold of interactions.

Also disclosed are methods that can recommend connecting on a platform based on participant interaction. One method includes tracking, by a processor, interaction between a pair of participants of a digital environment conducted on a first platform and, in response to the interaction between the pair of participants exceeding a predetermined threshold of interactions, recommending, by the processor, that the pair of participants connect on a second platform.

Computer program products including a computer-readable storage device including code embodied therewith that can recommend connecting on a platform based on participant interaction are further disclosed herein. The code is executable by a processor and causes the processor to track interaction between a pair of participants of a digital environment conducted on a first platform and recommend that the pair of participants connect on a second platform in response to the interaction between the pair of participants exceeding a predetermined threshold of interactions.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
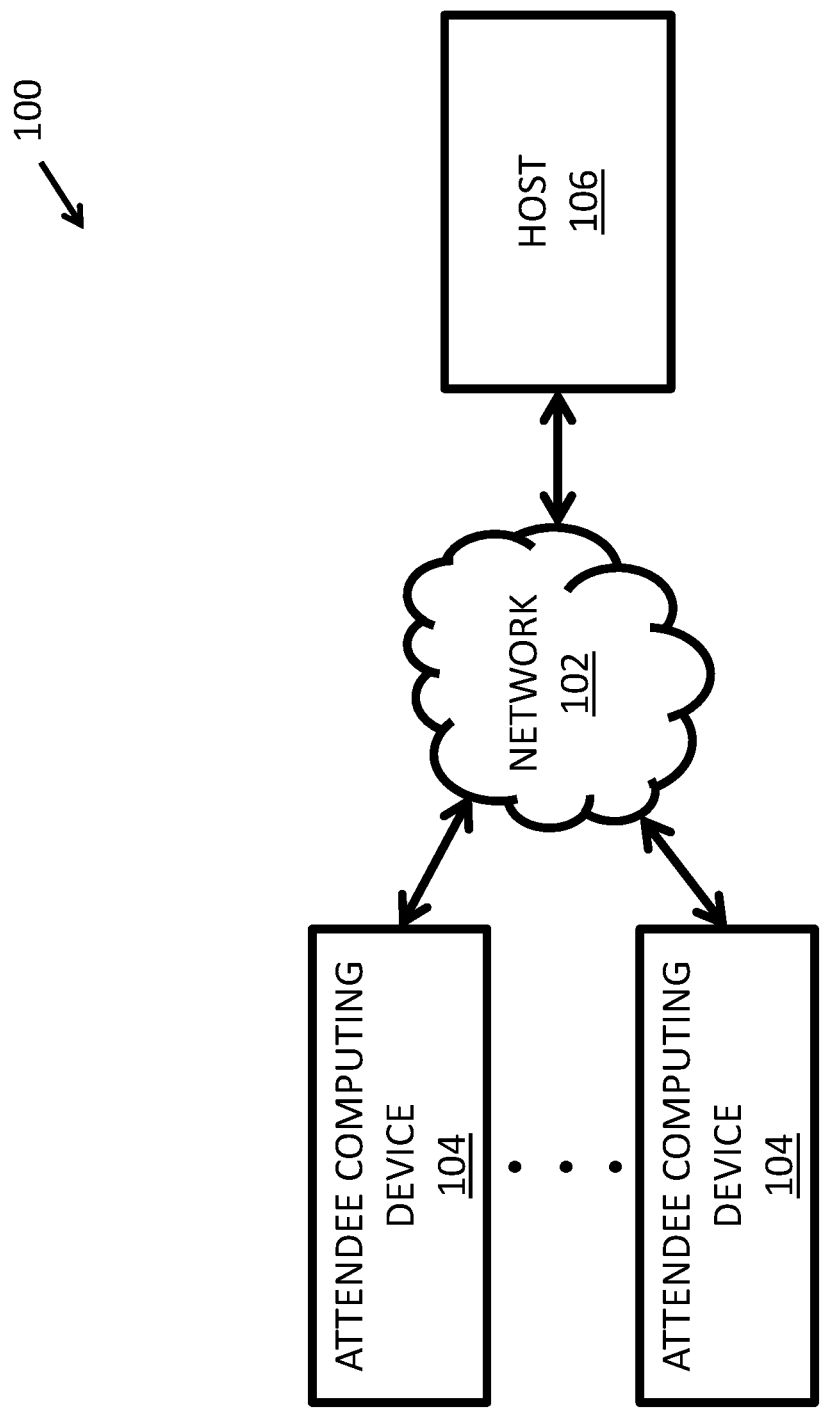
FIG. 1 is schematic block diagram of one embodiments of a computing system that can recommend connecting on a platform based on participant interaction.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a computing system 100 (and/or computing network 100) that can recommend connecting on a platform based on participant interaction. At least in the illustrated embodiment, the computing system 100 includes, among other components, a network 102 connecting a set of one or more attendee computing devices 104 (also simply referred individually, in various groups, or collectively as attendee computing device(s) 104), and a host computing device 106 and/or host computing system 106 (or simply, host 108) to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of attendee computing devices 104 and the host 106 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., digital environment) with one another that are possible and contemplated herein.

An attendee computing device 104 may include any suitable computing system and/or computing device capable of accessing and/or communicating with one another and with the host 106 the via the network 102. Examples of an attendee computing device 104 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

Computing system 100 may include any suitable quantity of attendee computing devices 104. That is, while computing system 100 is illustrated in FIG. 1 as including two (2) attendee computing devices 104, the various embodiments of the computing system 100 are not limited to two attendee computing devices 104. In other words, various other embodiments of the computing system 100 may include one (1) attendee computing device 104 or any quantity of attendee computing devices 104 greater than two attendee computing devices 104.

In various embodiments, an attendee computing device 104 can include a computing device used by a participant in a digital environment. In additional embodiments, a computing device used by a moderator of a digital environment can be considered an attendee computing device 104. Further, as used herein, the terms attendee and participant can be referred to interchangeably and/or can include the same meaning.

Figure 2A:
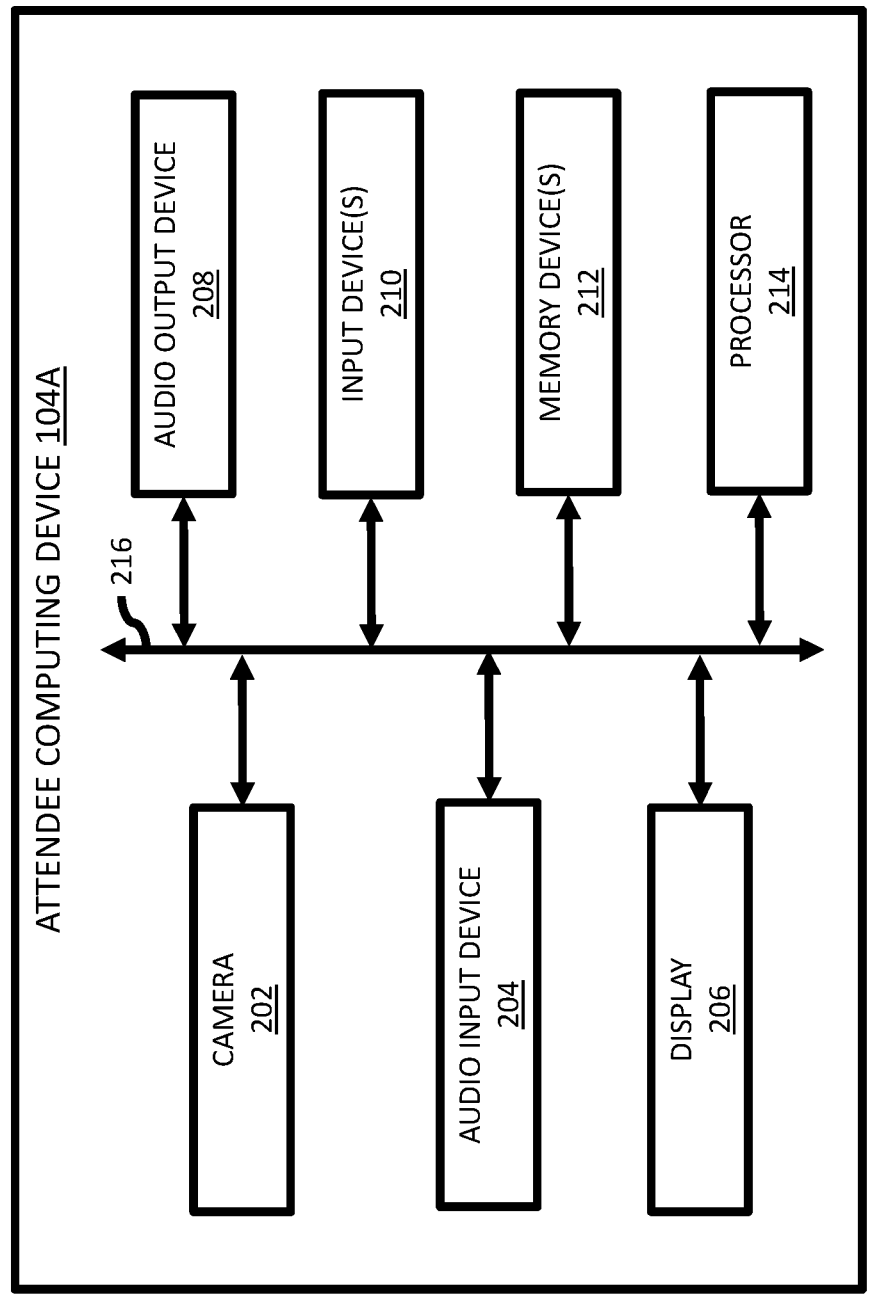
FIGS. 2A and 2B are schematic block diagrams of various embodiments of an attendee computing device included in the computing system of FIG. 1.

With reference to FIG. 2A, FIG. 2A is a block diagram of one embodiment of an attendee computing device 104A. At least in the illustrated embodiment, the attendee computing device 104A includes, among other components, a camera 202, an audio input device 204, a display 206, an audio output device 208, one or more input devices 210, one or more memory devices 212, and a processor 214 coupled to and/or in communication with one another via a bus 216 (e.g., a wired and/or wireless bus).

A camera 202 may include any suitable device that is known or developed in the future capable of capturing and transmitting images, video feeds, and/or video streams. In various embodiments, the camera 202 includes at least one video camera.

An audio input device 204 may include any suitable device that is known or developed in the future capable of capturing and transmitting audio/sound, audio feeds, and/or audio streams. In various embodiments, the audio input device 204 includes at least one microphone.

A display 206 may include any suitable device that is known or developed in the future capable of displaying images/data, video/data feeds, and/or video/data streams. In various embodiments, the display 206 may include an internal display or an external display. In some embodiments, the display 206 is configured to display a video/data feed of the attendees (e.g., students, workers, adults, children, colleagues, etc.) and/or a moderator (e.g., an adult, a teacher, a boss, an individual in charge, etc.) of a digital environment (e.g., a virtual learning system, a virtual learning platform, virtual learning application/software, a classroom management system, a classroom management platform, classroom management software/application, online learning system, online learning platform, online learning application/software, a distance learning system, a distance learning platform, distance learning application/software, a video conference system, a video conference platform, digital environment application/software, a virtual classroom, a virtual meeting, etc., and/or the like digital environments or digital environments) while the digital environment is in progress.

An audio output device 208 may include any suitable device that is known or developed in the future capable of receiving and providing audio/sound, audio feeds, and/or audio streams. In various embodiments, the audio output device 208 includes a speaker, a set of headphones, and/or a set of earbuds, etc., among other suitable audio output devices that are possible and contemplated herein.

An input device 210 may include any suitable device that is known or developed in the future capable of receiving user input. In various embodiments, the input device 210 includes a keyboard, a mouse, a trackball, a joystick, a touchpad, and/or a touchscreen, etc., among other suitable input devices that are possible and contemplated herein.

A set of memory devices 212 may include any suitable quantity of memory devices 212. Further, a memory device 212 may include any suitable type of device and/or system that is known or developed in the future that can store computer-useable and/or computer-readable code. In various embodiments, a memory device 212 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 214).

A memory device 212, in some embodiments, includes volatile computer storage media. For example, a memory device 212 may include random access memory (RAM), including dynamic RAM (DRAM), synchronous dynamic RAM (SDRAM), and/or static RAM (SRAM). In other embodiments, a memory device 212 includes non-volatile computer storage media. For example, a memory device 212 may include a hard disk drive, a flash memory, and/or any other suitable non-volatile computer storage device that is known or developed in the future. In various embodiments, a memory device 212 includes both volatile and non-volatile computer storage media.

Figure 3:
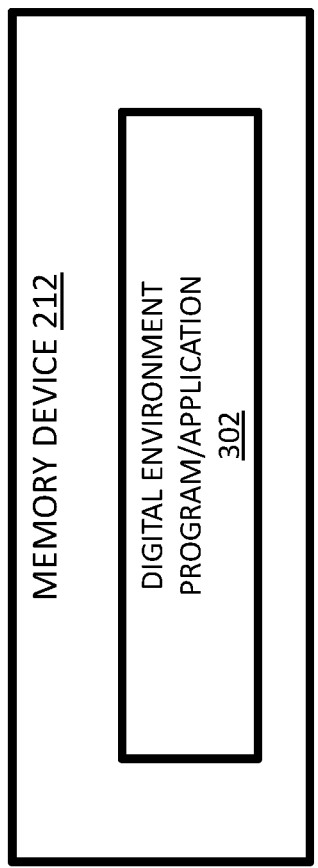
FIG. 3 is schematic block diagram of one embodiment of a memory device included in the attendee computing devices of FIGS. 2A and 2B.

With reference now to FIG. 3, FIG. 3 is a schematic block diagram of one embodiment of a memory device 212. At least in the illustrated embodiment, the memory device 212 includes, among other components, a digital environment program and/or application 302, that is configured to operate/function when executed by the processor 214.

A digital environment program/application 302 may include any suitable commercial and/or private digital environment program and/or application that is known or developed in the future. Examples of a digital environment program/application 302 include, but are not limited to, Microsoft Teams®, Zoom®, Google Meet®, Cisco Webex®, GoToMeeting®, Skype®, LanSchool®, Google Classroom™, Blackboard®, etc., and/or the like digital environment programs/applications, each of which is contemplated herein. In some embodiments, the digital environment program/application 302 can include an enterprise and/or proprietary digital environment program and/or application.

In various embodiments, a digital environment program/application 302 is configured to utilize the camera 202 and the audio input device 204 to capture one or more images and one or more audios/sounds, respectively, and generate a video feed and/or video stream that includes the captured image(s) and audio(s)/sound(s) (e.g., of a user). The video feed and/or video stream that includes the captured image(s) and audio(s)/sound(s) of the user can include the interaction(s) between the user and each other participant (e.g., attendee) in real-time during the digital environment. The digital environment program/application 302, in some embodiments, is further configured to transmit the video feed and/or video stream to one or more other attendee computing devices 104 and the host 106.

In various embodiments, the digital environment program/application 302 is further configured to receive video feeds and/or video streams from each other attendee computing devices 104 (e.g., a computing device utilized by a participant and/or attendee of the digital environment). The digital environment program/application 302 is also configured to utilize the display 206 and the audio output device 208 to display the image(s) and play the audio(s)/sound(s), respectively, in the received video feed and/or video stream (e.g., to a user).

The user interaction(s) captured by each camera 202 and/or input device 204, at various times, may include any suitable behavior(s) and/or interaction(s) that can occur in a digital environment. For example, the user behavior(s) may include the user literally and/or figuratively (e.g., electronically) talking/speaking, asking a question, providing an answer, making a suggestion, and/or providing additional material(s), information, and/or resource(s), etc., among other behaviors and/or interactions that are possible and contemplated herein. In various embodiments, a set of one or more auditory cues and/or one or more visual cues can define the user's behavior(s) and/or interaction(s).

Auditory cues can include, but are not limited to, any type of word(s), sound(s), and/or noise(s), etc., whether generated by a human (e.g., analog cues) and/or by a non-human (e.g., digital cues via a computing device/machine, a mechanical device/machine, etc.). Visual cues can include, but are not limited to, any type of gesture(s), typed message (e.g., chat, instant message, private message, etc.), picture(s), video(s), and/or other visual representation(s), etc., whether generated by a human (e.g., analog cues) and/or a non-human (e.g., digital cues via a computing device/machine, a mechanical device/machine, etc.).

Referring back to FIG. 2A, a processor 214 may include any suitable non-volatile/persistent hardware and/or software configured to perform and/or facilitate performing various processing functions and/or operations. In various embodiments, the processor 214 includes hardware and/or software for executing instructions in one or more digital environment modules and/or applications 402 (see, e.g., FIG. 4). The digital environment modules and/or applications executed by the processor 214 can be stored on and executed from a memory device 212 and/or from the processor 214.

Figure 4:
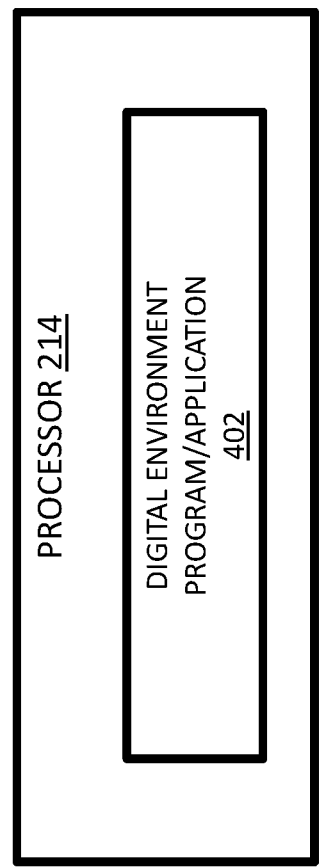
FIG. 4 is schematic block diagram of one embodiment of a processor included in the attendee computing devices of FIGS. 2A and 2B.

With reference to FIG. 4, FIG. 4 is a schematic block diagram of one embodiment of a processor 214. At least in the illustrated embodiment, the processor 214 includes, among other components, a digital environment program/application 402 similar to the digital environment program/application 302 in the memory device 212 discussed with reference to FIG. 3.

Figure 2B:
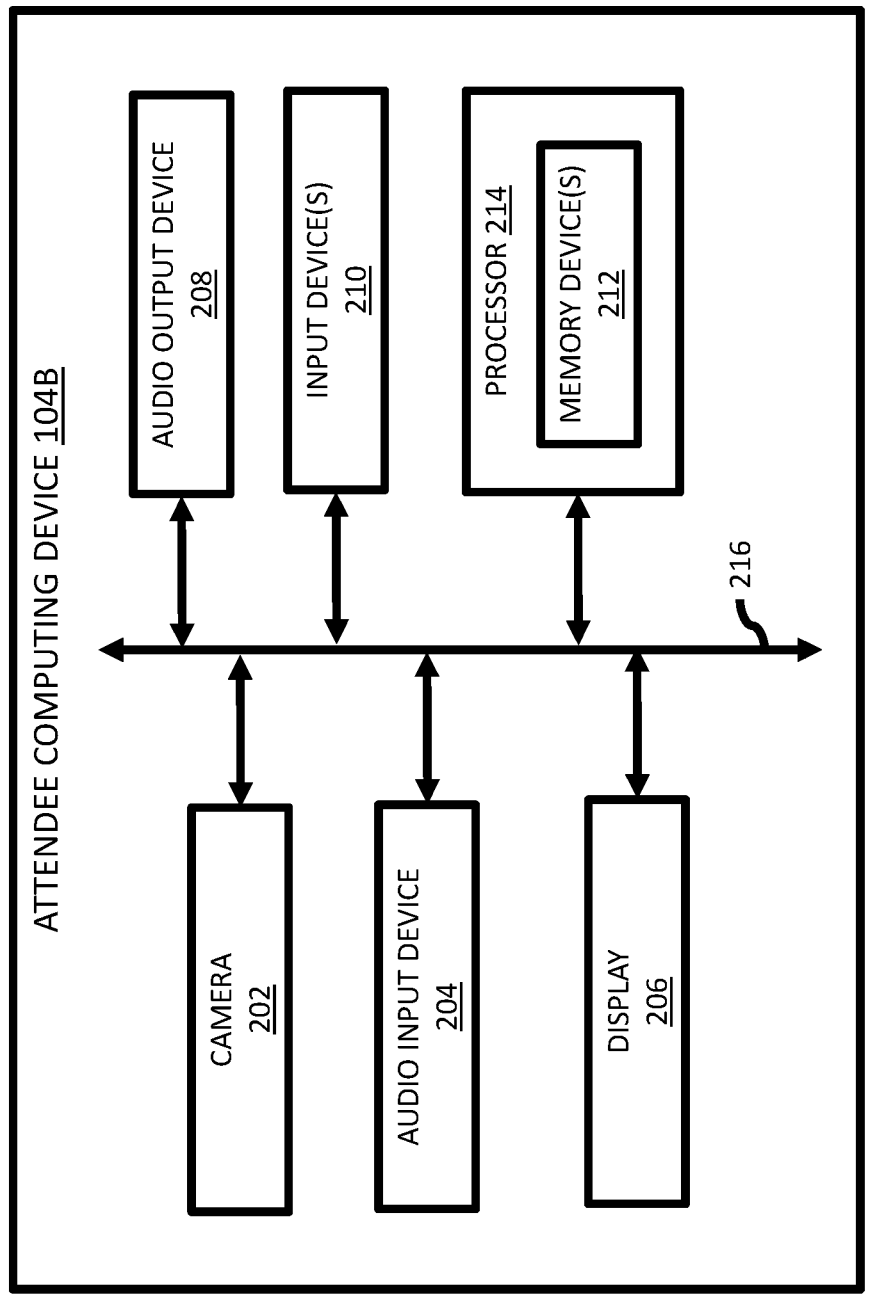

Referring to FIG. 2B, FIG. 2B is a block diagram of another embodiment of an attendee computing device 104B. The attendee computing device 104B includes, among other components, a camera 202, an audio input device 204, a display 206, an audio output device 208, one or more input devices 210, one or more memory devices 212, and a processor 214 coupled to and/or in communication with one another via a bus 216, similar to the camera 202, audio input device 204, display 206, audio output device 208, input device(s) 210, memory device(s) 212, processor 214, and bus 216 discussed with reference to the attendee computing devices 104A illustrated in FIG. 2A. Alternative to the attendee computing device 104A, the processor 214 in the attendee computing device 104B includes the memory device(s) 212 as opposed to the memory device(s) 212 of the attendee computing device 104A being a different device than and/or independent of the processor 214.

Referring again to FIG. 1, a host 106 may include any suitable computer hardware and/or software that can launch operations in a digital environment (e.g., a virtual meeting, virtual classroom, etc.). In various embodiments, the host 106 includes computer hardware and/or software that can launch the operations for the digital environment.

A host 106, in various embodiments, can include one or more processors, computer-readable memory, and/or one or more interfaces, among other features and/or hardware. A host 106 can further include any suitable software component or module, or computing device(s) that is/are capable of hosting and/or serving a software application or services, including distributed, enterprise, and/or cloud-based software applications, data, and services. For instance, a host 106 can be configured to host, serve, or otherwise manage digital environments, or applications interfacing, coordinating with, or dependent on or used by other services, including digital environment applications and software tools for a digital environment. In some instances, a host 106 can be implemented as some combination of devices that can comprise a common computing system and/or device, server, server pool, or cloud computing environment and share computing resources, including shared memory, processors, and interfaces.

Figure 5A:
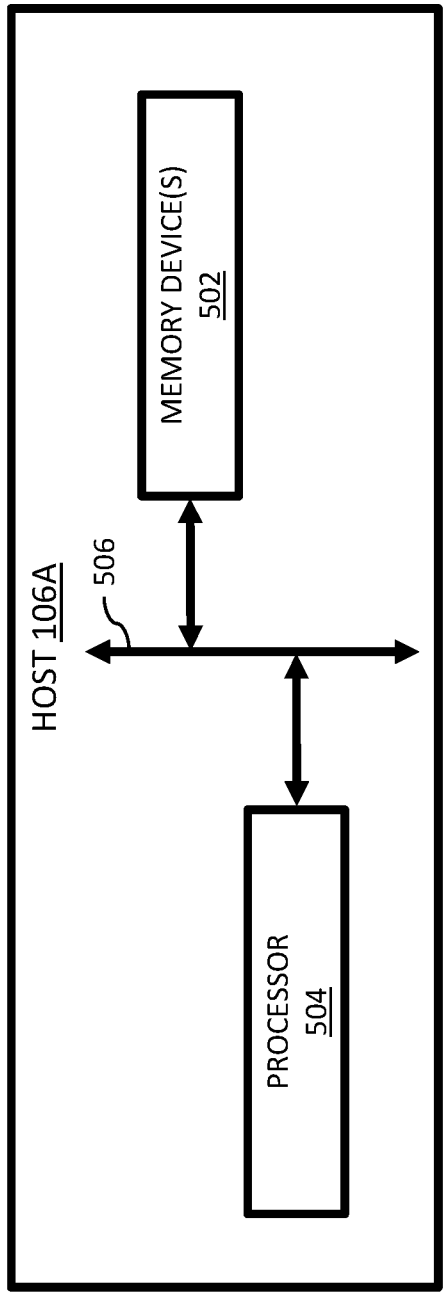
FIGS. 5A and 5B are schematic block diagrams of various embodiments of host computing device included in the computing system of FIG. 1.

Referring to FIG. 5A, FIG. 5A is a block diagram of one embodiment of a host 106A. At least in the illustrated embodiment, the host 106A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 6:
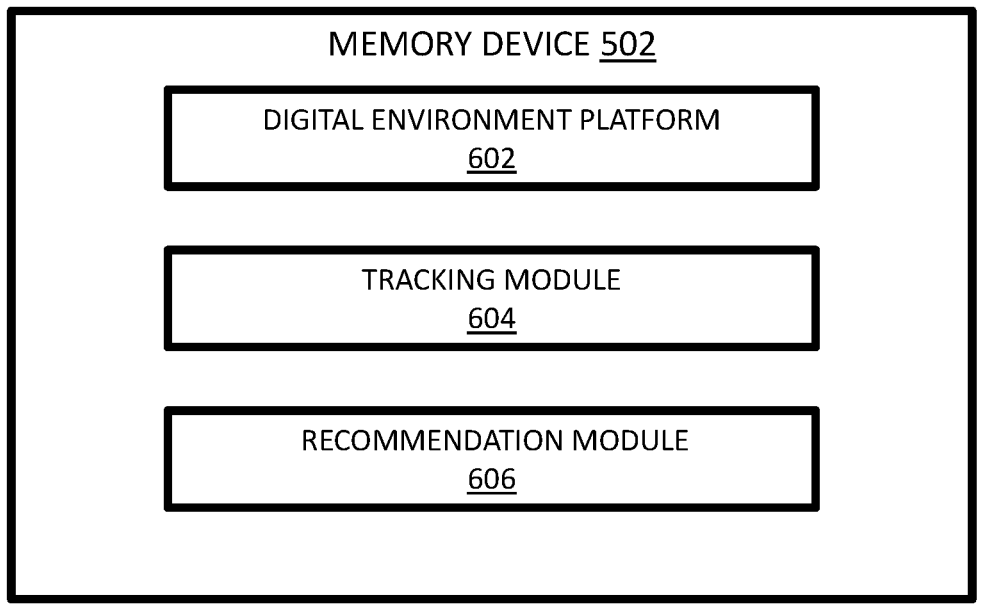
FIG. 6 is schematic block diagram of one embodiment of a memory device included in the host computing devices of FIGS. 5A and 5B.

With reference now to FIG. 6, FIG. 6 is a schematic block diagram of one embodiment of a memory device 502. At least in the illustrated embodiment, the memory device 502 includes, among other components, a digital environment platform 602, a tracking module 604, and a recommendation module 606 that are each configured to operate/function in conjunction with one another when executed by the processor 504 to recommend connecting on a platform based on participant interaction. In various embodiments, the tracking module 604 and the recommendation module 606 are each configured to operate/function in conjunction with one another when executed by the processor 504 to recommend connecting on a platform based on participant interaction.

A digital environment platform 602 may include any suitable commercial, private, and/or enterprise digital environment program and/or application that is known or developed in the future. In various embodiments, a digital environment platform 602 is configured to transmit the video feeds and/or video streams generated by the attendee computing devices 104 to one another.

The video feed and/or video stream generated by each attendee computing device 104 (e.g., a source computing device) can include audio and/or video of its user (e.g., a participant (e.g., an attendee or moderator)) and/or written/digital messages input by the user. The audio, video, and/or messages of each user of an attendee computing device 104 can represent and/or convey the behavior(s) of the user (e.g., a student, worker, colleague, moderator, peer, etc.) of an attendee computing device 104 and/or the interaction(s) between the attendee and each other attendee of a digital environment.

A tracking module 604 may include any suitable hardware and/or software that can track participant interaction in a digital environment. In various embodiments, the tracking module 604 is configured to track the interaction(s) between each participant/attendee of one or more digital environments (e.g., video conference, virtual classroom, etc.).

The interaction(s) between each participant/attendee of one or more digital environments can be tracked using any suitable method and/or technique that is known or developed in the future capable of identifying and quantifying interaction between a pair of participants. In various embodiments, the interaction(s) between a pair of participants can be tracked using the biometrics of a participant (e.g., face, voice, gesture, etc.) and/or via a user identifier (e.g., @user).

Tracking the interaction(s) between each pair of participants can include any suitable interaction and/or type of interaction that is known or developed in the future. In various embodiments, an interaction can include a direct interaction between two participants and/or a back-and-forth interaction between a pair of participants. Example interactions can include, but are not limited to, voice/dialog interactions, text interactions, gesture interactions, and/or the like interaction(s) between each pair of participants of a digital environment.

For example, in a voice/video call, direct interactions can be measured by voice activities immediately follow a voice activity (e.g., Participant A's voice activities immediately or substantially immediately followed Participant B's voice activities). In another non-limiting example, in a chat session, the @user can be used to measure direct interaction (e.g., Participant C's message activities immediately or substantially immediately followed Participant D's message activities).

In addition, the interaction(s) between each pair of participants can include any suitable interaction and/or type of interaction that is known or developed in the future that can be quantified. Further, the expression or measurement of the quantity of the interaction(s) can include any suitable quantification that is known or developed in the future.

In some embodiments, the quantification is based on time. For example, a time quantification can include, but is not limited to, the total amount of time a pair of participants interact, an amount of time of a single interaction, a relative amount of time, a comparative amount of interaction time compared to one or more other pairs of participants of a digital environment (e.g., the most interactions, the most direct interactions, etc.), and/or the like time-based quantifications.

In additional or alternative embodiments, the quantification is based on a quantity of interactions. For example, a quantity quantification can include, but is not limited to, the total number of voice/video interactions, a total number of digital environments in which the same pair of participants attended, a total number texted/typed words, sentences, and/or exchanges during a virtual meeting/classroom, a comparative number of interactions during a virtual meeting/classroom, and/or the like quantities and/or type of quantities.

In various embodiments, the tracking module 604 is configured to determine whether the tracked interaction(s) is/are greater than a predetermined threshold of interactions. The determination of whether the tracked interaction(s) is/are greater than the predetermined threshold of interactions can be made by comparing the tracked interaction(s) and the threshold of interactions and calculating whether the tracked interaction(s) are greater than or less than the threshold of interactions. In accordance with various embodiments, tracked interaction(s) that are equal to the threshold of interactions can be considered the equivalent of greater than or the equivalent of less than the threshold of interactions.

The predetermined threshold of interactions can be any suitable threshold that is known or developed in the future. For example, a threshold for the total amount of time a pair of participants interact can include an amount of time greater than five (5) minutes, ten (10) minutes, fifteen (15) minutes, and/or the like amounts of time during a single and/or particular digital environment. Similarly, a threshold for the amount of time of a single interaction can include an amount of time greater than 5 minutes, 10 minutes, 15 minutes, and/or the like amounts of time during a single and/or particular exchange.

A non-limiting example of a threshold relative amount of time can include five percent (5%), ten percent (10%), twenty percent (20%), etc. of the total time of a single or particular virtual meeting/classroom. Likewise, a threshold comparative amount of interaction time compared to one or more other pairs of participants of a digital environment can include the most interactions, the most direct interactions, and/or the like.

Similarly, a threshold for the total number of voice/video interactions can include a quantity greater than about five (5) interactions, ten (10) interactions, twenty (20) interactions, or fifty (50) interactions, etc. during a single virtual meeting/classroom. Further, a threshold for the total number of digital environments in which the same pair of participants attended can include a quantity greater than one (1), two (2), three (3), four (4), five (5), ten (10), etc. digital environments attended by the same pair of participants.

A threshold for the total number texted/typed words, sentences, and/or exchanges during a virtual meeting/classroom can include any suitable quantity of texted/typed words, sentences, and/or exchanges. Further, a threshold for a comparative number of interactions during a virtual meeting/classroom, can include the greatest/most number of interactions and/or a quantity or interactions greater than the quantity of interactions of one or more other pairs of participants that include at least one different participant.

In various embodiments, the tracking module 604 is configured to track the status of each participant of a digital environment. For example, the tracking module 604 can track over time whether a participant and/or each participant of a digital environment and/or digital environment platform is a federated user (e.g., an authorized user) or a non-federated user (e.g., invited user and/or temporary authorized user, etc.) of the digital environment and/or the digital environment platform. Here, the digital environment and/or digital platform can be owned and/or controlled by one or more entities, which can include one or more first party entities, one or more second party entities, and/or one or more third party entities. In tracking the status of a user, the tracking module 604 can determine and/or identify when the status of a user changes from a federated user to a non-federated user of a digital environment and/or a digital environment platform, which can include the user leaving an entity, the expiration of a predetermined amount of time, and/or the expiration of a temporary status for a user.

The tracking module 604, in certain embodiments, is configured to do nothing in response to determining that the status of a user has not changed from a federated user to a non-federated user. In additional or alternative embodiments, the tracking module 604 is configured to do nothing in response to determining that the predetermined threshold of interaction(s) has not been met and/or exceeded.

In various embodiments, the tracking module 604 is configured to notify the recommendation module 606 and/or transmit a notification to the recommendation module 606 in response to determining that the status of a user has changed from a federated user to a non-federated user and that the predetermined threshold of interaction(s) has been met and/or exceeded. Here, the notice and/or notification can identify to the recommendation module 606 the user whose status has change from being federated to being non-federated and also identify the other participant in the pair of participants in which their interaction(s) met and/or exceeded the predetermined threshold of interaction(s).

A recommendation module 606 can include any suitable hardware and/or software that can make one or more recommendations in response to receiving a notice and/or notification from the tracking module 604. In various embodiments, the recommendation module 606 is configured to transmit a recommendation to each participant in the pair of participants identified as including interaction(s) that met and/or exceeded the predetermined threshold of interaction(s).

In various embodiments, the recommendation to each participant in the identified pair of participants can include a recommendation to connect, associate, meet, and/or become friends, and/or otherwise become connected on a digital environment and/or a digital environment platform that is different than the digital environment and/or the digital environment platform on which the pair of participants were previously connected and/or associated. In this manner, participants that had interaction(s) that met and/or exceeded the predetermined threshold of interaction(s) on a previous/first digital environment and/or digital environment platform can become connected and/or associated, etc. on new/different/second digital environment and/or digital environment platform.

In some embodiments, the recommended new/different/second digital environment and/or digital environment platform can be the same type of digital environment and/or digital environment platform. For example, the recommended new/different/second digital environment and/or digital environment platform can be a different video conference and/or video conference platform (e.g., Microsoft Teams®, Zoom®, Google Meet®, Cisco Webex®, GoToMeeting®, Skype®, LanSchool®, Google Classroom™, Blackboard®, etc., and/or the like) in response to the previous/first digital environment and/or digital environment platform being video conference and/or video conference platform.

In other embodiments, the recommended new/different/second digital environment and/or digital environment platform can be a different type of digital environment and/or digital environment platform. For example, the recommended new/different/second digital environment and/or digital environment platform can be a social media and/or social media platform (e.g., Facebook®, LinkedIn®, You- Tube®, WhatsApp®, Instagram®, TikTok®, Snapchat®, Pinterest®, Reddit®, Twitter®, etc., and/or the like) in response to the previous/first digital environment and/or digital environment platform being video conference and/or video conference platform.

In certain embodiments, the recommendation can include a link to the recommended new/different/second digital environment and/or digital environment platform and actuating the link can connect and/or associate the identified pair of participants on the new/different/second digital environment and/or digital environment platform. In additional or alternative embodiments, the recommendation can identify the name, email address, user page, handle, phone number, and/or any other type of contact/identifying information for each participant.

In further additional or alternative embodiments, the recommendation can include context information. For example, the context information can include information/data that identifies how and/or when the participants interacted. That is, the context information can identify the virtual meeting/classroom, when the virtual meeting/classroom took place, which entity (company, school, organization, etc.) hosted the virtual meeting/classroom, and/or any other suitable information/data that can trigger the memory of a participant to recollect the interaction(s) with the other participant.

In some embodiments, the recommendation can direct each participant in the pair of participants to the recommended new/different/second digital environment and/or digital environment platform. In alternative embodiments, the recommendation is void of directing the pair of participants to the recommended new/different/second digital environment and/or digital environment platform and it is left up to the participants themselves to connect and/or associate on the new/different/second digital environment and/or digital environment platform.

Referring back to FIG. 5A, a processor 504 may include any suitable non-volatile/persistent hardware and/or software configured to perform and/or facilitate performing various processing functions and/or operations. In various embodiments, the processor 504 includes hardware and/or software for executing instructions in one or more modules and/or applications. The modules and/or applications executed by the processor 504 can be stored on and executed from a memory device 502 and/or from the processor 504.

Figure 7:
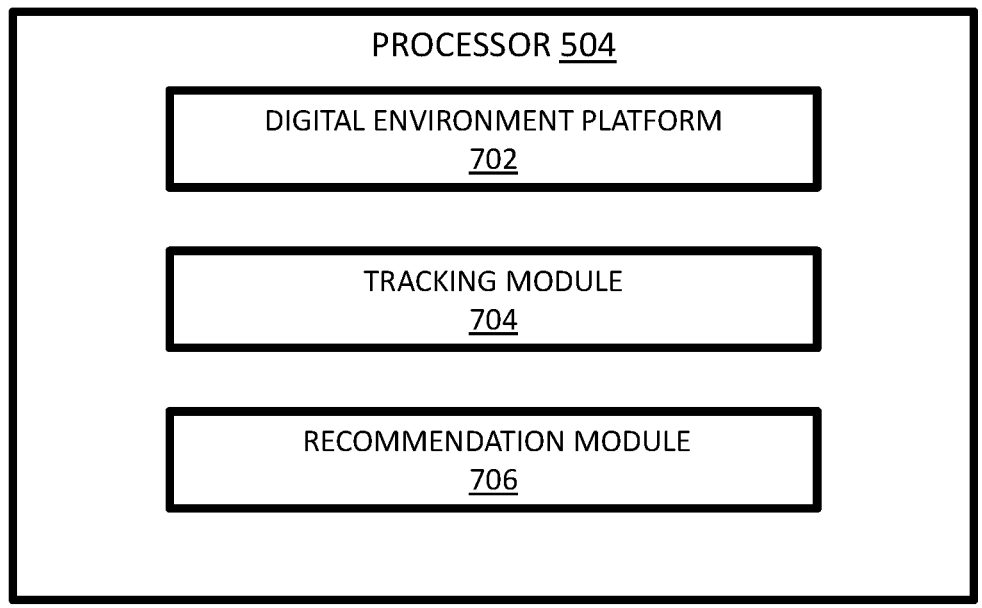
FIG. 7 is schematic block diagram of one embodiment of a processor included in the host computing devices of FIGS. 5A and 5B.

With reference to FIG. 7, FIG. 7 is a schematic block diagram of one embodiment of a processor 504. At least in the illustrated embodiment, the processor 504 includes, among other components, a digital environment platform 702, a tracking module 704, and a recommendation module 706 similar to the digital environment platform 602, tracking module 604, and recommendation module 606 in the memory device 502 discussed with reference to FIG. 6.

Figure 5B:
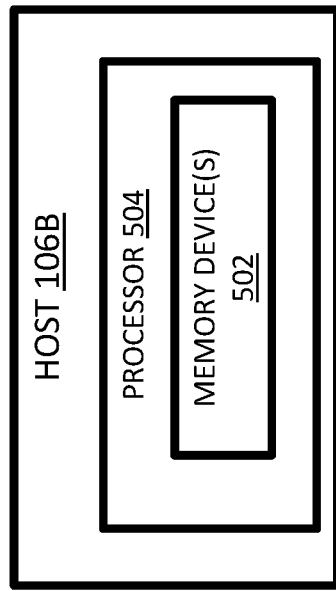

Referring to FIG. 5B, FIG. 5B is a block diagram of another embodiment of host 106B. The host 106B includes, among other components, one or more memory devices 502 and a processor 504 similar to the host 106A discussed with reference to FIG. 5A. Alternative to the host 106A, the processor 504 in the host 106B includes the memory device(s) 502 as opposed to the memory device(s) 502 of the host 106A being a different device(s) than and/or independent of the processor 504.

Figure 8:
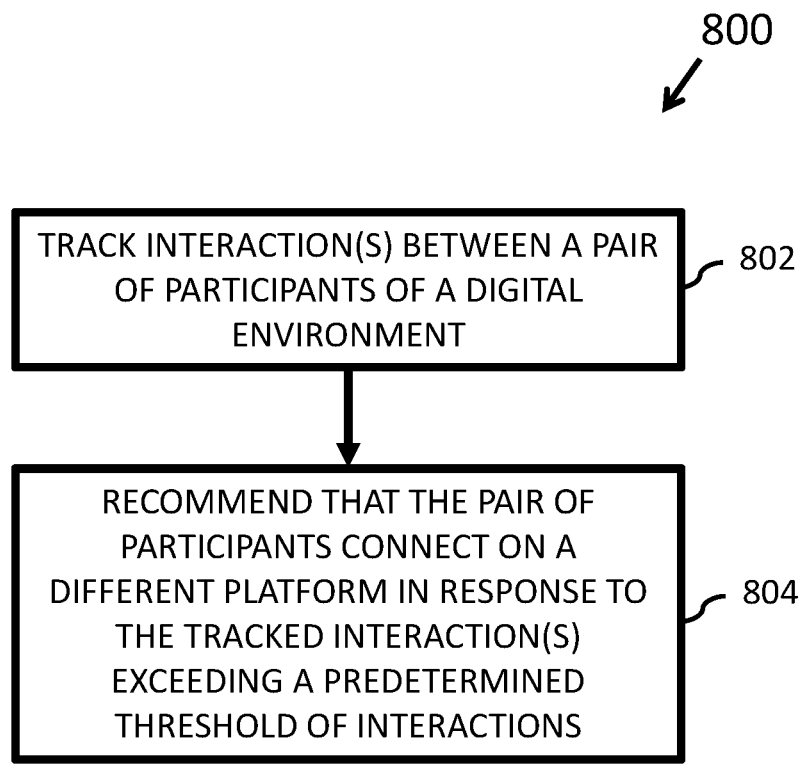
FIG. 8 is a schematic flow chart diagram illustrating one embodiment of a method that can recommend connecting on a platform based on participant interaction.

Referring to FIG. 8, FIG. 8 is a schematic flow chart diagram illustrating one embodiment of a method 800 for recommending connecting on a platform based on participant interaction. At least in the illustrated embodiment, the method 800 begins by a processor (e.g., processor 504) tracking interaction between a pair of participants of a digital environment conducted on an original platform (block 802). The interaction(s) can include any suitable interaction and/or be performed using any method and/or technique as discussed elsewhere herein.

The method 800 further includes the processor 504 recommending that the pair of participants connect on a different platform in response to the interaction between the pair of participants on the original platform exceeding a predetermined threshold of interactions (block 804). The threshold of interaction(s) can include any suitable threshold of interaction as discussed elsewhere herein.

Figure 9:
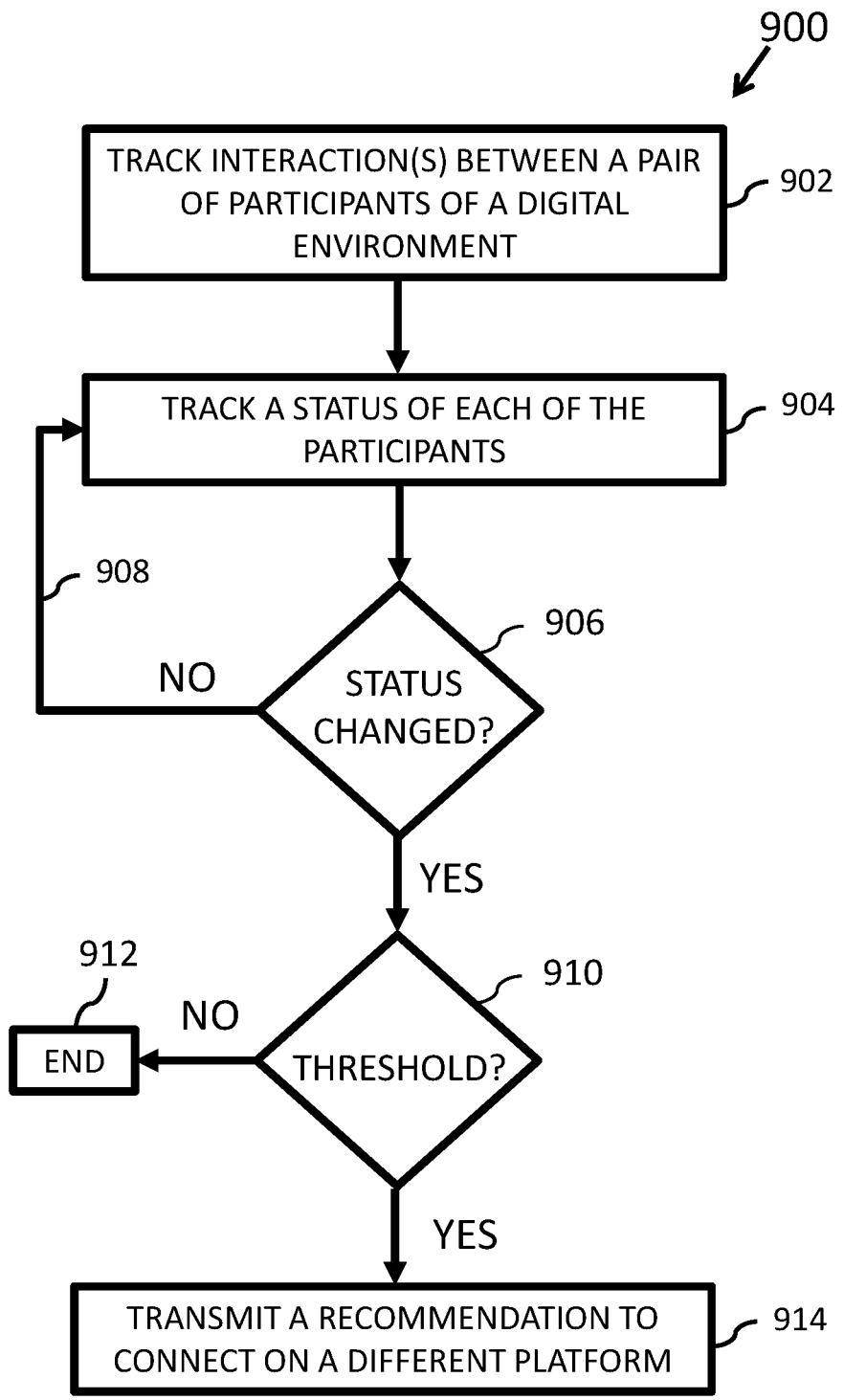
FIG. 9 is a schematic flow chart diagram illustrating another embodiment of a method that can recommend connecting on a platform based on participant interaction.

With reference to FIG. 9, FIG. 9 is a schematic flow chart diagram illustrating another embodiment of a method 900 for recommending connecting on a platform based on participant interaction. At least in the illustrated embodiment, the method 900 begins by a processor (e.g., processor 504) tracking interaction between a pair of participants of a digital environment conducted on an original platform (block 902). The interaction(s) can include any suitable interaction and/or be performed using any method and/or technique as discussed elsewhere herein.

The method 900 further includes the processor 504 tracking a federated or non-federated status of each participant of the pair of participants (block 904). The processor then determines whether the federated status of one or the participants changed to a non-federated status (block 906).

In response to the federated status of both participants not changing (e.g., a "NO" in block 906), the processor 504 continues to track the status of the participants (return 908). In response to the federated status of one of the participants changing (e.g., a "YES" in block 906), the processor 504 determines whether the interaction(s) between the pair of participants exceeded a threshold of interaction(s) (block 910).

In response to the interaction(s) between the pair of participants not exceeding the threshold of interaction(s) (e.g., a "NO" in block 910), the processor 504 ends tracking the participants as a pair (block 912). In response to the interaction(s) between the pair of participants exceeding the threshold of interaction(s) (e.g., a "YES" in block 910), the processor 504 transmits a recommendation to each participant recommending that the pair of participants connect on a different platform (block 914). Here, the threshold of interaction(s) can include any suitable threshold of interaction as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory coupled to the processor, the memory comprising instructions executable by the processor to cause the apparatus to:
track interaction between a pair of participants of a digital environment conducted on a first platform,
track an authorization status on the first platform for each participant of the pair of participants,
determine a change in the authorization status on the first platform for at least one participant in the pair of participants, determine that the interaction between the pair of participants on the first platform exceeds a predetermined threshold of interactions, and recommend that the pair of participants connect on a second platform that is different from the first platform in response to determining the change in the authorization status on the first platform for the at least one participant and in further response to determining that the interaction between the pair of participants exceeding the predetermined threshold of interactions.

2. The apparatus of claim 1, wherein the interaction between the pair of participants comprises a voice dialog between the pair of participants.

3. The apparatus of claim 1, wherein the interaction between the pair of participants comprises a text dialog between the pair of participants.

4. The apparatus of claim 1, wherein the first platform comprises a video conferencing platform and the second platform comprises a social networking platform.

5. The apparatus of claim 1, wherein the first platform comprises a first video conferencing platform and the second platform comprises a second video conferencing platform.

6. The apparatus of claim 1, wherein:
recommending that the pair of participants connect on the second platform is performed in further response to an expiration of the digital environment.

7. The apparatus of claim 1, wherein:
the pair of participants each include a federated authorization status on the first platform during the digital environment; and
recommending that the pair of participants connect on the second platform is performed in further response to at least one participant of the pair of participants becoming a non-federated authorization status on the first platform subsequent to the digital environment.

8. A method, comprising:
tracking, by a processor, interaction between a pair of participants of a digital environment conducted on a first platform;
tracking, by the processor, an authorization status on the first platform for each participant of the pair of participants;
determining, by the processor, a change in the authorization status on the first platform for at least one participant in the pair of participants;
determining, by the processor, that the interaction between the pair of participants on the first platform exceeds a predetermined threshold of interactions; and
in response to determining the change in the authorization status on the first platform for the at least one participant and in further response to determining that the interaction between the pair of participants exceeding the predetermined threshold of interactions, recommending, by the processor, that the pair of participants connect on a second platform that is different from the first platform.

9. The method of claim 8, wherein the interaction between the pair of participants comprises a voice dialog between the pair of participants.

10. The method of claim 8, wherein the interaction between the pair of participants comprises a text dialog between the pair of participants.

11. The method of claim 8, wherein the first platform comprises a video conferencing platform and the second platform comprises a social networking platform.

12. The method of claim 8, wherein the first platform comprises a first video conferencing platform and the second platform comprises a second video conferencing platform.

13. The method of claim 8, wherein:
recommending that the pair of participants connect on the second platform is performed in further response to an expiration of the digital environment.

14. The method of claim 8, wherein:
the pair of participants each include a federated authorization status on the first platform during the digital environment; and
recommending that the pair of participants connect on the second platform is performed in further response to at least one participant of the pair of participants becoming a non-federated authorization status on the first platform subsequent to the digital environment.

15. A computer program product comprising a computer-readable storage device including code embodied therewith, the code executable by a processor to cause the processor to:
track interaction between a pair of participants of a digital environment conducted on a first platform;
track an authorization status on the first platform for each participant of the pair of participants;
determine a change in the authorization status on the first platform for at least one participant in the pair of participants;
determine that the interaction between the pair of participants on the first platform exceeds a predetermined threshold of interactions; and
recommend that the pair of participants connect on a second platform that is different from the first platform in response to determining the change in the authorization status on the first platform for the at least one participant and in further response to determining that the interaction between the pair of participants exceeding the predetermined threshold of interactions.

16. The computer program product of claim 15, wherein the interaction between the pair of participants comprises at least one of a voice dialog and a text dialog between the pair of participants.

17. The computer program product of claim 15, wherein the first platform comprises a video conferencing platform and the second platform comprises a social networking platform.

18. The computer program product of claim 15, wherein the first platform comprises a first video conferencing platform and the second platform comprises a second video conferencing platform.

19. The computer program product of claim 15, wherein:
recommending that the pair of participants connect on the second platform is performed in further response to an expiration of the digital environment.

20. The computer program product of claim 15, wherein:
the pair of participants each include a federated authorization status on the first platform during the digital environment; and
recommending that the pair of participants connect on the second platform is performed in further response to at least one participant of the pair of participants becoming a non-federated authorization status on the first platform subsequent to the digital environment.

* * * * *